(12) United States Patent
Langley

(10) Patent No.: US 6,513,853 B2
(45) Date of Patent: Feb. 4, 2003

(54) WINDSHIELD COVER

(76) Inventor: Bryan G. Langley, 12940 Eagle Ridge Dr., Burnsville, MN (US) 55337

( * ) Notice: Subject to any disclaimer, the term of this patent is extended or adjusted under 35 U.S.C. 154(b) by 0 days.

(21) Appl. No.: 09/766,409

(22) Filed: Jan. 22, 2001

(65) Prior Publication Data

US 2002/0096907 A1 Jul. 25, 2002

(51) Int. Cl.$^7$ .................................................. B60J 3/00
(52) U.S. Cl. ................................... 296/65.1; 160/370.21
(58) Field of Search ......................... 296/95.1, 136; 160/370.21; 150/168, 166

(56) References Cited

U.S. PATENT DOCUMENTS

| | | | | |
|---|---|---|---|---|
| 3,046,048 A | * | 7/1962 | Cheney | 296/95.1 |
| 4,842,324 A | * | 6/1989 | Carden | 296/95.1 X |
| 4,863,210 A | * | 9/1989 | Kenon | 296/95.1 X |
| 5,102,183 A | * | 4/1992 | Swartz | 296/95.1 X |
| 5,415,214 A | * | 5/1995 | Bock et al. | 150/168 |
| 5,435,362 A | * | 7/1995 | Chiang | 296/95.1 X |
| 5,615,923 A | * | 4/1997 | Madison | 296/95.1 |
| 5,697,416 A | * | 12/1997 | Bock et al. | 150/168 |
| 6,076,577 A | * | 6/2000 | Ontaneda | 150/168 |

* cited by examiner

Primary Examiner—Joseph D. Pape
Assistant Examiner—Patricia Engle
(74) Attorney, Agent, or Firm—Angenheim Law Firm; Norman P. Friederichs; N. Paul Friederichs

(57) ABSTRACT

A windshield cover having a first panel adapted to overlie the windshield and the cowl of an automobile, a second and third panel adapted to overlie at least the upper portion of the front doors of the automobile, fourth and fifth panels adapted to lie between the front doors and the adjacent cab portion of the automobile when the front doors are in a closed position thereby preventing theft of the windshield cover, the windshield cover being adapted to protect the windshield of the automobile.

8 Claims, 1 Drawing Sheet

WINDSHIELD COVER

FIELD OF THE INVENTION

The present invention relates to a cover device and more particularly to a device for covering the windshield and the window glass in the driver's side and passenger's side doors of an automotive vehicle.

BACKGROUND OF THE INVENTION

Cover devices have been known for many years. Perhaps one of the first cover devices was merely an animal skin that early man placed over items that he wanted to protect. Today there are literally thousands of covers for many purposes. One category of cover devices are those that make use of a fabric such as canvas for protective purposes. Included in this category are tents, tarps for covering grain and the like.

Cover devices are known for use in covering portions of the automobile. These cover devices include canvas covers for automobiles. Such covers may be used in the storage of classic cars. Cover devices, typically referred to as sun shields, have been provided in the past for windshields to protect from the sun. The sun often raises the interior temperature of the automobile to extreme temperatures that cause damage to the interior of the automobile. The extreme temperatures may cause the polymer surfaces in the automobile to crack and/or discolor. The sun shields generally approximate the size of the interior of the windshield. The sun shields are generally trapped at the lower edge by the dashboard and along the upper edge by the small sun visors of the automobile.

Prior sun visors have certain inherent problems and shortcomings. For example, such sun visors typically do not fit snugly against the window and therefore a zone exists between the sun visor and the window where heat is created by the sun. This heated zone feeds hot air into the interior cab portion of the automobile. The sun visor may be easily dislodged and by merely falling out of place between the dashboard and the sun visors. The prior sun visors are not effective for protecting the windshield from frost, snow and/or freezing rain. The present invention overcomes the disadvantages of the prior art by providing a cover that may be lodged as a cover on the outside of the windshield. The present cover includes mechanism to securely lock the device in place, preventing unintentional dislodgment of the device from its protective location.

SUMMARY OF THE PRESENT INVENTION

The present invention is a protective cover for an automotive windshield which overlies the outside surface of the windshield. The present automotive windshield may include a primary panel that approximates the size of the outer surface of the windshield, an upper panel that overlies the forward most portion of the roof surface and mechanism to lock the device in place. The locking mechanism may be a tab or panel the extends through the space between the closed door of the automobile and the frame around the door. A locking mechanism may be provided at each side edge of the device thereby securing the device at both of the closed doors of the automobile.

The present protective cover may include a pair of fabric layers, an inner layer disposed adjacent the windshield and an outer layer exposed to the weather during use. The fabric is desirably water repellant. The fabric may be decoratively colored with fade resistant dye. A heat transmitting sheet or member may be disposed between the inner layer and the outer layer. The heat transmitting member may be of any suitable material, such as a radiant barrier. A suitable radiant barrier is available from Astro-Foil of Lowell, Ind. under the designation Heatshield II. In a similar manner the windshield cover of the present invention may be placed over the rear window of the automobile with the flanges being locked in the rear doors of the automobile.

IN THE DRAWINGS

DETAILED DESCRIPTION OF THE PRESENT INVENTION

Figure 1:
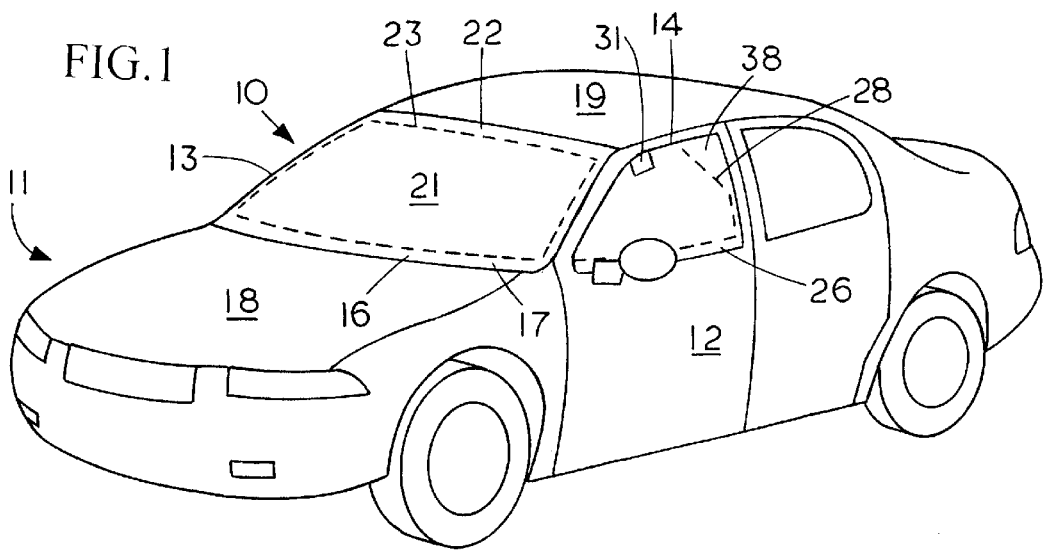
FIG. 1 shows an automobile with the cover device of the present invention in place to protect the windshield.
Figure 2:
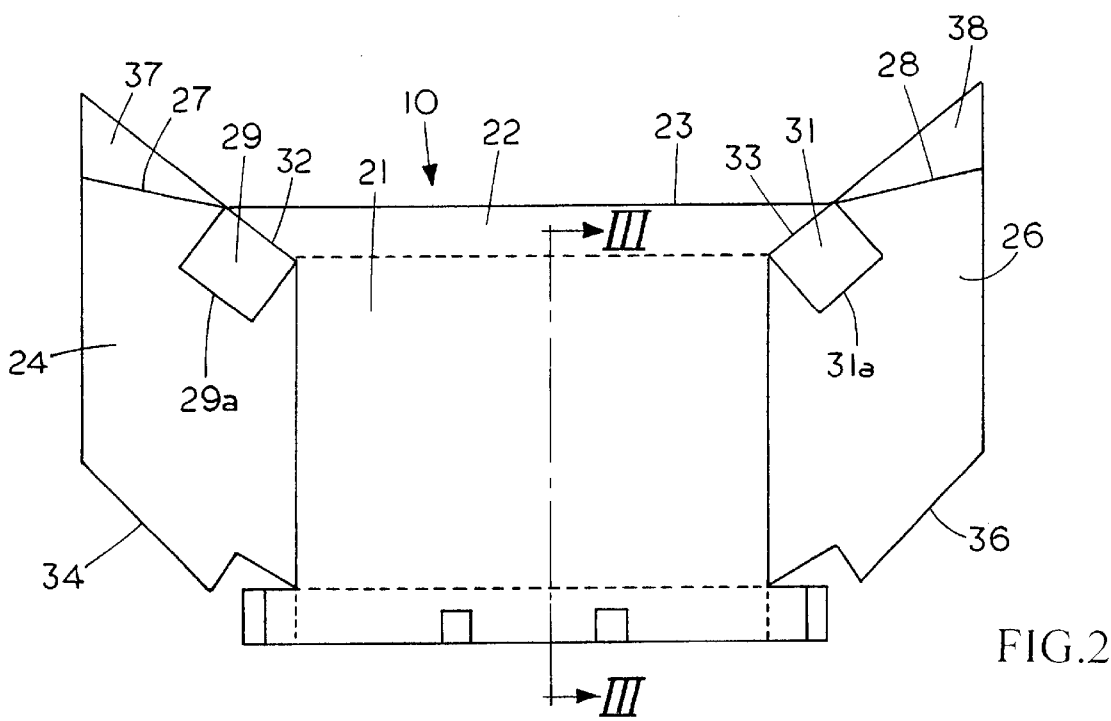
FIG. 2 is a plan view of the present invention; showing the side which is to be positioned against the vehicle and showing the pockets 37 and 38 held opens.

The windshield cover device 10 (FIGS. 1–3) of the present invention may be suitably used on an automobile 11. The automobile 11 may be any type of automobile including sedans, pick-up trucks, vans and the like. The automobile 11 has a pair of doors 12 and a plurality of windows including a windshield 13 and side windows 14. The automobile 11 includes a horizontal surface or cowl 16 that may be provided by the frame 17 underlying the windshield 13 and/or a portion of the hood 18. The protection to the cowl 16 prevents ice and snow from accumlating in the area that provides air input to the air conditioning unit of the automobile.

The windshield cover device 10 (FIG. 2) may include a primary panel 21. Panel 21 may be of a size suitable for protecting the windshield. For example, the size of panel 21 may approximate the size of the windshield 13 of the automobile 11. The device 10 desirably has an upper panel 22 adapted to engage a horizontal portion of the roof 19 of the automobile. The upper panel 22 may hingedly connected to the primary panel 21 along line 23.

Device 10 may include a pair of side panels 24 and 26 that overlie at least a portion of each of the side windows 14. The side panels 24 and 26 may be hingedly connected to the primary panel 21. The device 10 may include a pair of upside down pockets 37 and 38 having pocket edges 27 and 28 respectively in the upper portion of side panels 24 and 26 that serve to encase the upper portion of each side door 12 of the automobile 11.

The side panels 24 and 26 may each include a locking flange 29, 31 respectively. The locking flanges 29 and 31 may be similarly constructed. Flanges 29 and 31 may be hingedly connected to panels 24 and 26 along lines 32, 33, respectively. Flanges 29 and 31 may include a thicken portion 29a and 31a for purposes hereinafter described. The device 10 may have a pair of side flanges 34 and 36 for purposes hereinafter described.

Figure 3:
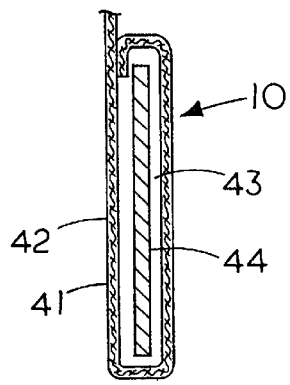
FIG. 3 is a sectional view of the present invention taken along the line III—III.

The device 10 may be of any suitable construction. A preferred embodiment is shown in FIG. 3 including an inner layer of fabric 41 and an outer layer of fabric 42. The fabric layer 41 and fabric layer 42 may form an envelop 43 that surrounds a layer of heat transmitting material 44 such as of Heatshield(TM). The pocket edges 27 and 28, for example, may be formed by compressing the device along the respective lines. Various modifications may be made to the present invention without departing from the scope of the following claims. For example, the windshield cover may be used for protection in the summer as well as the winter. The present windshield cover may be made of any of many materials including fabric as well as sheet material.

What is claimed is:

1. A windshield cover comprising:

a first panel adapted to overlie a windshield and a cowl of an automobile, second and third panels joined to the first panel, each panel having a pocket and adapted to overlie at least an upper portion of a front door of an automobile, fourth and fifth panels joined to the first panel and adapted to lie between an upper portion of a front door and an adjacent cab portion of an automobile when a front door is in a closed position.

2. The windshield cover of claim 1 wherein the fourth and fifth panels each include a thickened portion adapted to lie entrapped within an automobile passenger compartment.

3. The windshield cover of claim 2 wherein the pockets are each adapted to overlie an upper rear corner of a front door of an automobile.

4. The windshield cover of claim 3 wherein the windshield cover includes a top panel that is adapted to overlie a forward upper portion of a roof of an automobile when the cover is secured in place on an automobile.

5. The windshield cover of claim 1 wherein the windshield cover comprises an inner heat transmitting layer and at least one outer protective layer overlying the inner layer.

6. A windshield cover comprising:

a first panel adapted to overlie a windshield of an automobile, second and third panels joined to the first panel, and adapted to lie between an upper edge of a front door and an adjacent cab portion of an automobile when front doors are in a closed position, and fourth and fifth panels, each having a thickened portion, each adapted to overlie at least an upper portion of a front door of an automobile such that the thickened portion is positionable inside a cab portion of a vehicle, and each being joined to the first panel.

7. The windshield cover of claim 6 wherein the fourth and fifth panels are adapted to overlie at least an upper front portion of front doors of an automobile.

8. The windshield cover of claim 7 wherein the first panel is adapted to overlie a windshield and a cowl of an automobile.

* * * * *